(12) United States Patent
Bieker et al.

(10) Patent No.: US 7,591,350 B2
(45) Date of Patent: Sep. 22, 2009

(54) ELECTROMOTIVELY ADJUSTED DISC BRAKE

(75) Inventors: Dieter Bieker, Oberaudorf (DE); Luise Ulrike Bieker, legal representative, Oberaudorf (DE); Johann Baumgartner, Moosburg (DE); Robert Trimpe, Wessling (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 434 days.

(21) Appl. No.: 10/541,197

(22) PCT Filed: Dec. 22, 2003

(86) PCT No.: PCT/EP03/14726
§ 371 (c)(1),
(2), (4) Date: Sep. 13, 2006

(87) PCT Pub. No.: WO2004/061324
PCT Pub. Date: Jul. 22, 2004

(65) Prior Publication Data
US 2007/0158145 A1 Jul. 12, 2007

(30) Foreign Application Priority Data
Jan. 2, 2003 (DE) .................. 103 00 013

(51) Int. Cl.
*B60T 13/74* (2006.01)
(52) U.S. Cl. .................. 188/72.9; 188/71.9

(58) Field of Classification Search .......... 188/2 D, 188/72.6–72.9, 156–164
See application file for complete search history.

(56) References Cited

U.S. PATENT DOCUMENTS

| | | | | |
|---|---|---|---|---|
| 6,899,204 | B2 * | 5/2005 | Baumgartner et al. | 188/72.9 |
| 7,086,504 | B2 * | 8/2006 | Baumgartner et al. | 188/71.9 |
| 7,134,532 | B2 * | 11/2006 | Baumgartner et al. | 188/71.7 |
| 7,219,772 | B2 * | 5/2007 | Bieker et al. | 188/1.11 L |
| 2006/0266598 | A1 * | 11/2006 | Baumgartner et al. | 188/72.7 |

FOREIGN PATENT DOCUMENTS

| | | |
|---|---|---|
| DE | 101 39 910 A1 | 3/2002 |
| DE | 101 39 908 A1 | 10/2002 |
| DE | 102 52 301 A1 | 8/2003 |
| WO | WO 91/19115 | 12/1991 |
| WO | WO 02/14125 A2 | 2/2002 |
| WO | WO 02/14709 A2 | 2/2002 |

* cited by examiner

*Primary Examiner*—Christopher P Schwartz
(74) *Attorney, Agent, or Firm*—Crowell & Moring LLP (57) ABSTRACT

A disc brake having a caliper, an application device arranged in the caliper on one side of the brake disc, and electrically driven adjusting devices on both sides of the brake disc, in which all adjusting devices on both sides of the brake disc are driven by a single electric motor or two electric motors jointly, in the latter case, the two electric motors being arranged on a joint side of the caliper relative to the brake disc plane, and the at least one electric motor or the electric motors for driving the adjusting devices being arranged outside the caliper.

23 Claims, 8 Drawing Sheets

ELECTROMOTIVELY ADJUSTED DISC BRAKE

This application is a 371 of International application PCT/EP2003/014726, filed Dec. 22, 2003 and claims the priority of German application No. 13 00 013.5, filed Jan. 2, 2003, the disclosure of which are expressly incorporated by reference herein.

BACKGROUND AND SUMMARY OF THE INVENTION

This invention relates The invention relates to a pneumatically or electrically operated disc brake, and in particular to disc brakes with electrically driven adjusting devices with drive linkages to a reaction side of the brake disk.

Such a disc brake is known from International Patent Document WOPCT/EP 01/09370 the same applicant. In this document, two adjusting devices are in each case arranged in the caliper on both sides of the brake disc. According to one of the disclosed variants, the two adjusting devices arranged on the side of the brake disc opposite the application device are driven by a transmission and synchronization gearing of the type of a flexible shaft which is guided laterally in the caliper around the brake disc.

It is true that this arrangement has been successful per se. It is to be constructively further optimized here using an electromotive drive for the adjusting devices. It is a goal of the invention to solve this problem.

The invention solves this problem in the following manner. All adjusting devices on both sides of the brake disc are driven by a single electric motor or two electric motors jointly, in the latter case, the two electric motors being arranged relative to the brake disc plane on a joint side of the caliper. A transmission and/or synchronization gearing is arranged between the at least one adjusting device on the side of the brake disc opposite the application device—thus, on the reaction side—and the at least one—application-side—electric motor, and the at least one electric motor or the electric motors for driving the adjusting devices are preferably arranged outside the caliper.

Both variants, with only one or with two electric motors,—EC motors, for example, being suitable—have the advantage that no electric motor has to be arranged close to the brake disc on the side of the brake disc facing away from the application device.

Here, the further development, which has not been known, with two joint electric motors on only one side of the brake disc, one of which directly driving the transmission gearing, has the advantage that the individual electric motors can have smaller dimensions than when only one motor is used which has to drive all adjusting devices jointly. In this case, the synchronization of the adjusting devices on both sides of the brake disc is implemented by means of a suitable control and/or regulating program. In this case, the option and the design of the control device are particularly advantageously such that a separate controllability of the adjusting devices on both sides of the brake disc is permitted for ensuring asynchronous functions, for example, for cleaning the brake disc.

For ensuring a wear of the brake pads which is as uniform as possible, on each side of the brake disc, particularly preferably two mutually synchronized adjusting devices respectively are arranged which each consist of a sleeve and a screw.

Very preferably, the transmission and/or synchronization gearing is designed in a cost-effective and reliable manner as a flexible shaft. The latter is preferably equipped with one or two worm drives for driving the adjusting devices on the side of the brake disc opposite the application device.

Advantageously, the caliper is designed as a fixed caliper and the brake disc is axially movable by the amount of the working stroke of the brake. As an alternative, the caliper can also be designed as a sliding or hinged and/or flexible caliper which is movable by the amount of the working stroke.

Preferably at least one synchronization gearing respectively for synchronizing the two adjusting devices is arranged on each side of the brake disc inside the caliper. Here, the flexible shaft can take over this synchronizing function on the side of the brake disc facing away from the application device, which jointly synchronously drives the adjusting devices arranged there.

Other objects, advantages and novel features of the present invention will become apparent from the following detailed description of the invention when considered in conjunction with the accompanying drawings for example.

BRIEF DESCRIPTION OF THE DRAWINGS

FIGS. 7a to 7c are a sectional view of a further embodiment of a disc brake according to the invention, a detailed view, and a view of a variant of the area of the disc brake on the right in FIG. 7a.

DETAILED DESCRIPTION OF THE DRAWINGS

Figure 1:
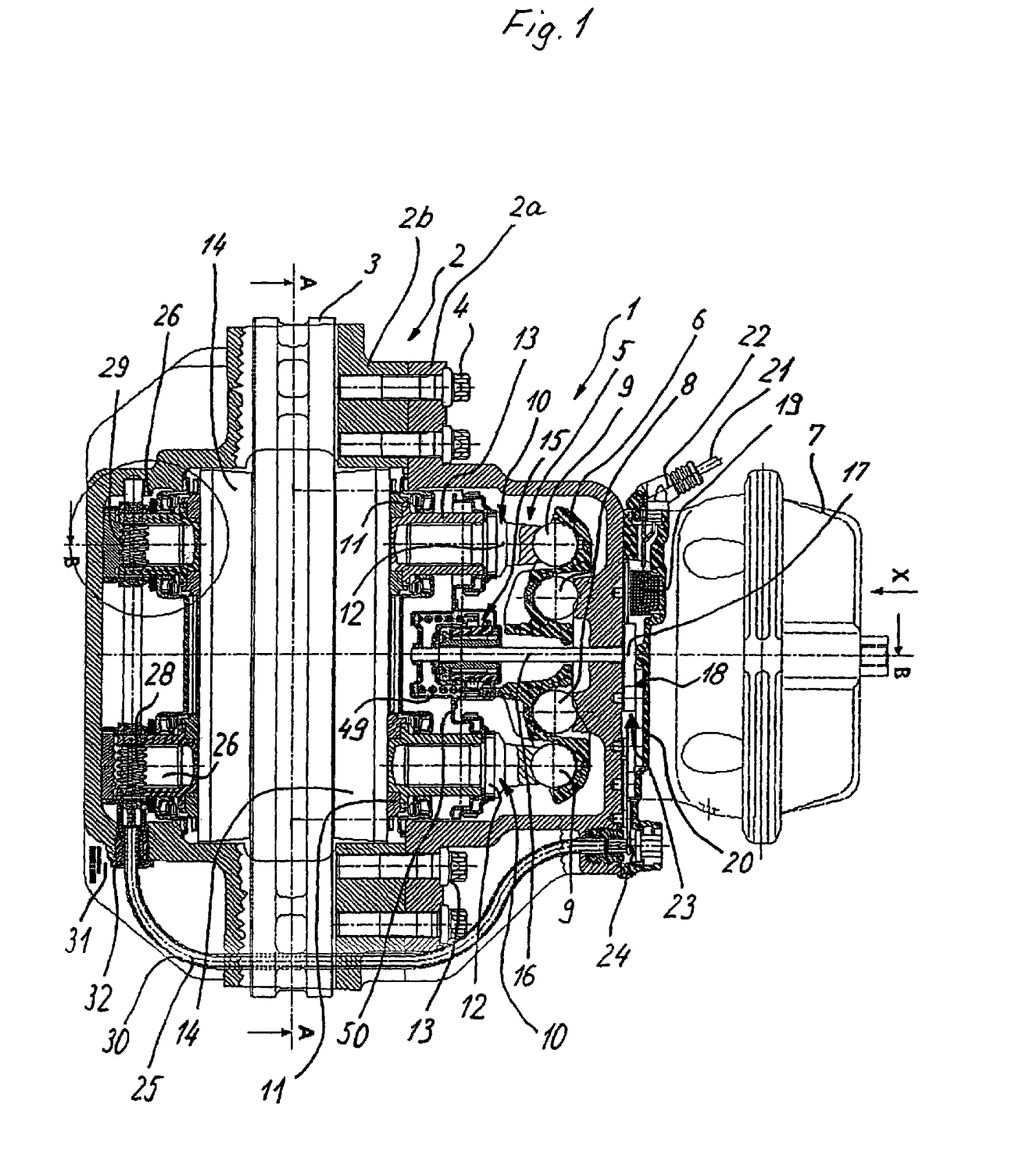
FIG. 1 is a sectional view of a first embodiment of a disc brake according to the invention.

FIG. 1 shows a disc brake 1 for utility vehicles having a caliper 2 which is in two parts here, with caliper parts 2a and 2b. The caliper frames a disc brake 3 in its upper circumferential area. The caliper parts 2a and 2b are screwed to one another by means of studs 4.

The caliper 2 is constructed as a fixed caliper; that is, it is fastened in an immobile manner, for example, on an axle flange (not shown here) of a pertaining vehicle.

The disc brake has an application device 5 which is arranged in the caliper 2 on one side of the brake disc 3 and has a rotary lever 6. The rotary lever 6 is operated by means of a piston rod 51 of a brake cylinder 7 visible in FIG. 3.

In its lower area, the rotary lever 6 is eccentrically disposed and is supported by way of two first spherical elements 8 in the interior of the caliper 2, whereas, on the opposite side of the rotary lever, two additional spherical elements 9 are provided which each act upon one of two axially displaceably arranged adjusting devices 10.

The two adjusting devices 10 on the application side of the brake disc 3 are aligned parallel with respect to one another and are provided with pressure pieces 11 at their end facing the brake disc, which pressure pieces 11 act upon a first application-side brake shoe 12 with a brake pad carrier and a brake pad material.

The adjusting devices 10 consist of screws 12 which have an external thread and interact with the internal thread of adjusting sleeves 13, a relative rotation between the screws 12 and the adjusting sleeves 13 changing the axial length of the adjusting device 10, which can be used for compensating the brake pad wear of the application-side brake pad 14; that is, the brake pad 14 arranged on the side of the application device.

The two adjusting devices 10 or their adjusting sleeves 13 are synchronously rotated by way of a synchromesh gear 15 arranged between the two adjusting sleeves, for example, by means of a toothed belt or a chain or by means of gear wheels.

The synchromesh gear 15 is driven by a shaft 16 which penetrates the rotary lever 16 as well as the caliper 2 and, at whose end outside the caliper 2, an output gear wheel 17 of a transmission 18 is arranged which is driven by an electric motor 19. Together with the transmission 18, this electric motor 19 is arranged in a cover 20 which is fastened below the brake cylinder 7 (see FIG. 3) on the exterior side of the caliper 2.

A line 21 with a plug 22 penetrating the cover 20 is used for the electric power supply as well as, if required, for the connection of control lines to an external computer. As an alternative, a separate control and/or regulating computer with its own microprocessor can also be arranged directly in the cover 20.

The transmission 18 has not only the one output gear wheel 17 but it is connected by way of additional gear wheels 23 with another output wheel 24 which, by way of a transmission and synchronization gearing in the form of a bendable shaft 25 extending on the outside of the caliper or through the caliper interior or through a duct in the caliper interior, is connected with the adjusting devices 26 on the side of the caliper facing away from the application device.

The bendable shaft 25 is used as a transmission gearing for the two additional adjusting devices 26 on the opposite side of the caliper or in the caliper interior on the opposite side of the brake disc. A restoring spring 49, which is supported on a metal sheet 50 fixed relative to the caliper or fastened to the latter, implements the restoring function for the application device 5 after a brake operation.

The two reaction-side adjusting devices 26, which are also parallel to one another, on the one side, are supported at the caliper interior and, on the other side, are also equipped with screws 12 and adjusting sleeves 13, which are rotatable relative to one another and, in the case of their relative rotatability, the then axial length of the adjusting devices is changed again, which, among other things, is used for compensating the brake pad wear of the reaction-side brake pad 14.

Corresponding to the fixed-caliper concept with the adjusting devices on both sides of the brake disc 3, the brake disc 3 is arranged to be axially movable, for example, displaceable on the wheel axle, by the amount of the working stroke of the disc brake.

According to FIG. 1, advantageously, a total of four adjusting devices 10, 26 and particularly also all adjusting devices on both sides of the brake disc are synchronously driven by only one electric motor on one side of the disc brake or on one side of the caliper 2 by only one motor. This results in relatively low material expenditures in view of the number of electric motors used.

In particular, it is also not necessary to arrange an electric motor on the side of the brake disc 3 opposite the application device. This may be advantageous because this motor would generally be subjected to slightly higher operating temperatures than the electric motor arranged on the side of the application device which is farther away from the brake disc 3.

Figure 2:
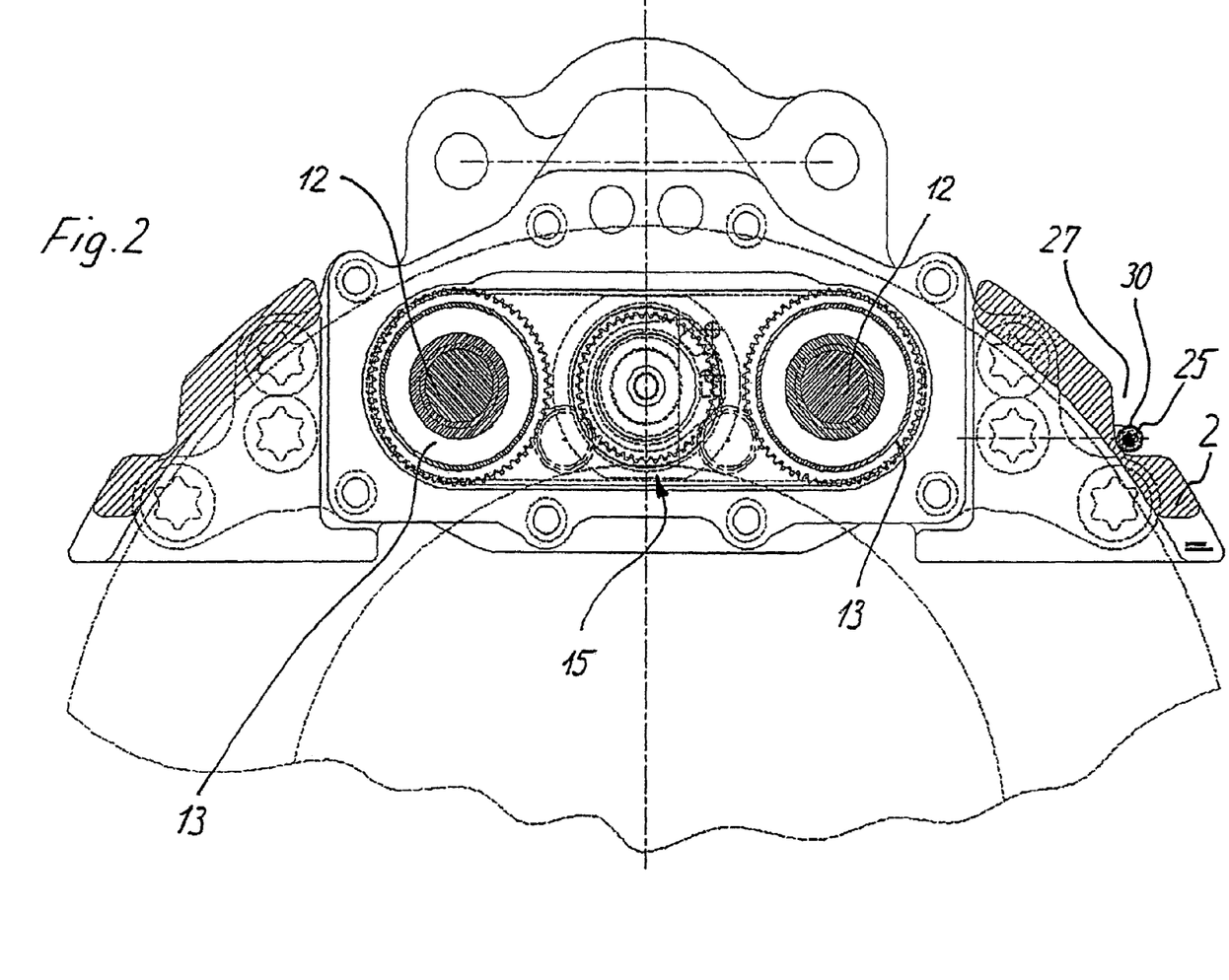
FIG. 2 is a view A-A of FIG. 1.

FIG. 2 is a sectional view, among other things, of the adjusting devices 10 with the screws 12 and the adjusting sleeves 13.

Figure 3:
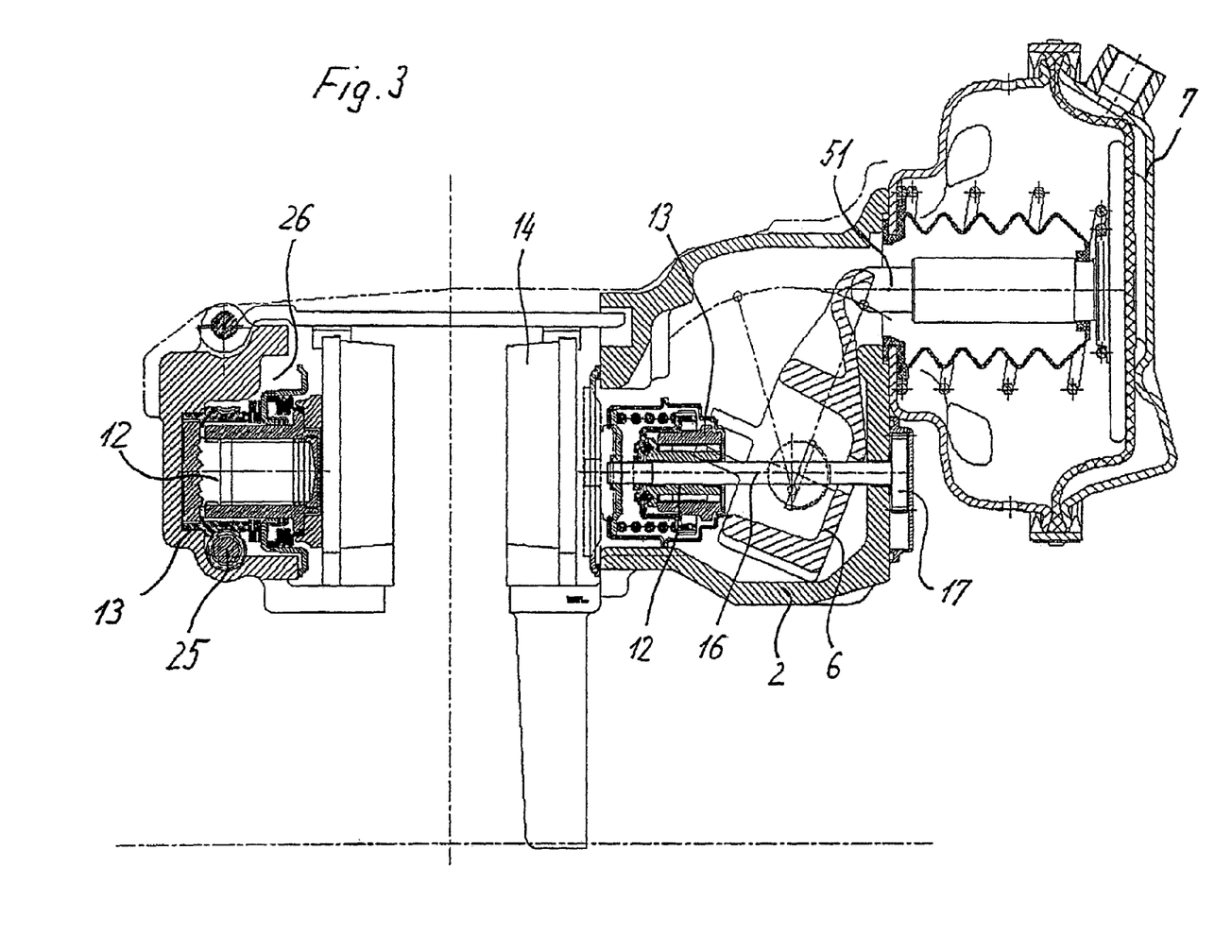
FIG. 3 is a view B-B of FIG. 1.
Figure 4:
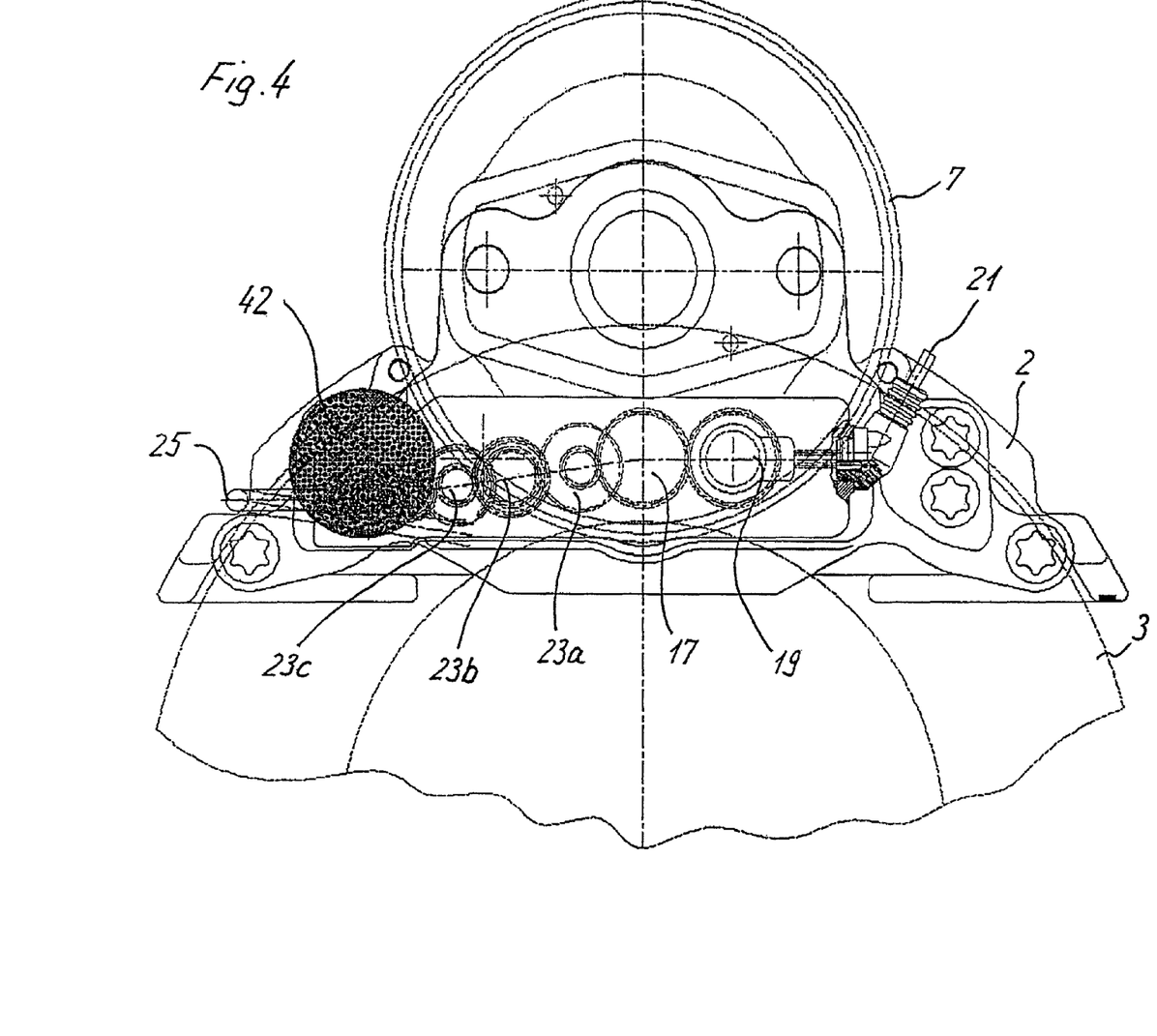
FIG. 4 is a view X of FIG. 1.

In contrast, FIG. 3 shows the first output gear wheel 17 as well as the other gear wheels 23a, 23b and 23c of the transmission which are arranged on the exterior side of the caliper 2 in the cover 20. The flexible shaft 25 is also visible here which is placed in a recess 27 of the caliper 2 on its outer edge.

In the area of the adjusting sleeve 13 of the two adjusting devices 26 on the side of the brake disc 3 opposite the application device 5, the bendable shaft 25 is equipped with worm gears 28, 29 which mesh, for example, with the externally toothed adjusting sleeves 13.

Particularly preferably, the flexible shaft 25 according to FIG. 1 is arranged in a tube 30 which may have a flexible construction and be placed on the exterior side of the caliper or on the exterior side of the caliper from one side of the brake disc to the other and, only on the opposite side of the brake disc 3 again penetrates the caliper 2 in the area of a bore 31, a guide-through stopper 32 being arranged between the tube and the interior wall of the bore 31.

The tube 30 may be provided with a friction- and wear-reducing intermediate layer which may consist, for example, of a thermally stable lubricant or a thermally stable slide coating.

The slide coating may be formed as a sliding paint or may consist of a synthetic base as well as of teflon. It may also be applied to the bendable shaft 25 or the interior tube wall. An intermediate layer is also conceivable as a sleeve made of a sliding material between the bendable shaft and the interior tube wall, a plastic sleeve or a teflon sleeve being conceivable here.

The worm gears 28, 29 may mesh either with gear wheels on the adjusting sleeves or with an axially toothed disc 34.

As an alternative, the two adjusting devices can also be coupled with one another by way of a separate synchronization gearing, such as a chain. By means of the arrangement selected in FIG. 1, it becomes advantageously possible to also implement the synchronization tasks of the reaction-side adjusting devices by means of only a single gearing—the bendable shaft 25.

Figure 7:
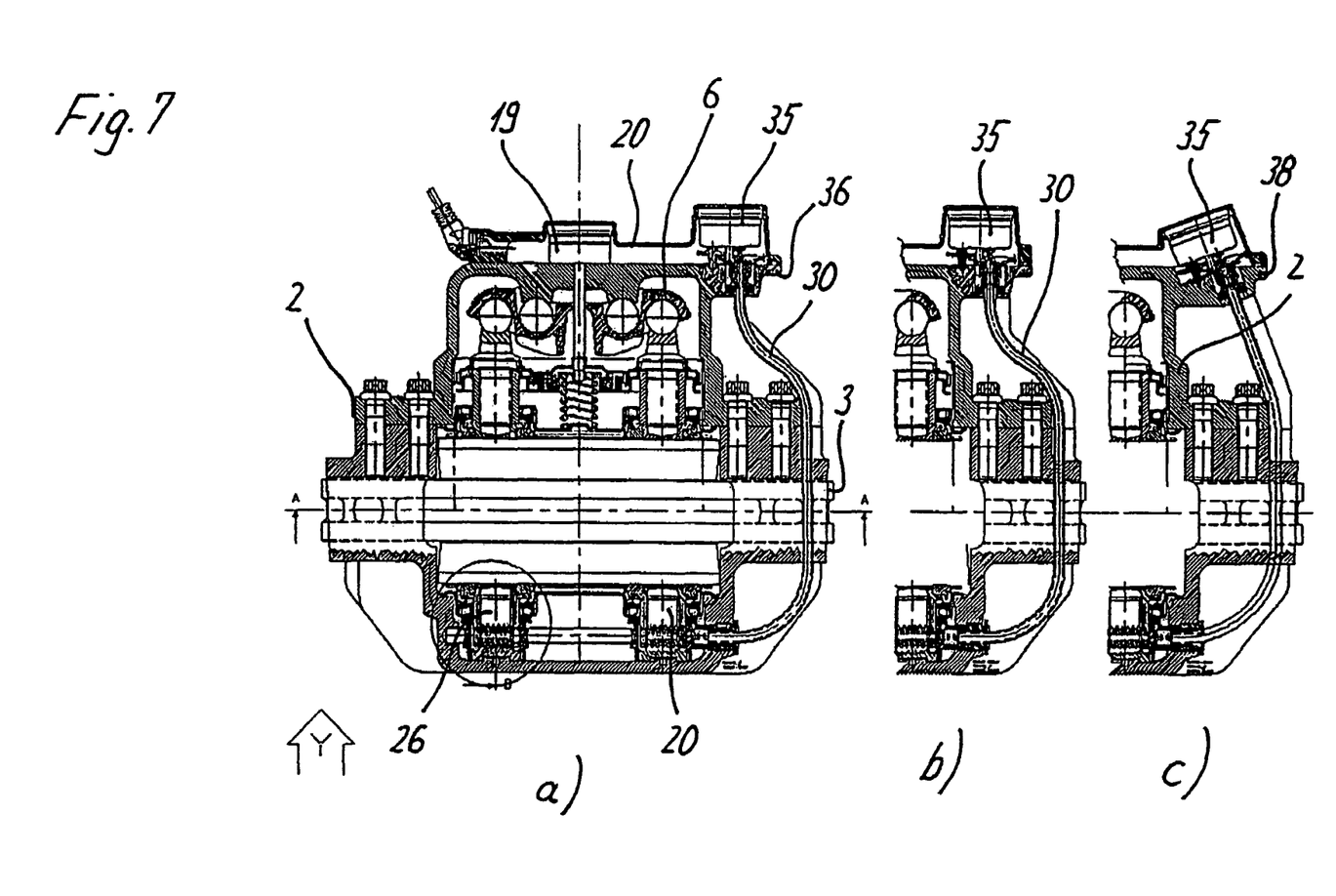

An alternative arrangement to FIG. 1 is shown in FIG. 7. Here, two electric motors 19, 35 are provided which are both arranged on the side of the brake disc provided with the application device—thus on a joint side—one of the electric motors 35 driving the bendable shaft 25 directly or by way of a gearing and the other electric motor here driving the shaft 16 directly (or by way of another gearing; not shown here).

However, another motor 35 is required in this case. This is contrasted by the advantage of the saving of some transmission elements. Also, the individual motors may have slightly smaller dimensions than in FIG. 1.

Here, the synchronization can take place by the controlling of the motors. For example, sensors for the position determination or other control and/or regulating-related measures, such as a position detection by way of an analysis of the motor current characteristic, are conceivable.

FIGS. 7b and 7c differ by the arrangement of the electric motor 35 for driving the bendable shaft 25. According to FIGS. 7a and b, the electric motor is fastened to the caliper 2 by means of a separate attachment 36, the output shaft 37 being aligned almost parallel to the brake disc axis. The bendable shaft 25 therefore has to be guided first in a curve toward the outside around the caliper and the brake disc 3 and then in another curve in the direction of the adjusting device 26 which reaches the shaft parallel to the disc plane and perpendicularly to the adjusting direction.

This is different in FIG. 7c. On the one hand, an attachment 38 is molded here directly to the caliper 2 itself. On the other hand, the motor or its output shaft 37 is oriented to be slightly inclined with respect to the brake disc axis, so that the bendable shaft has to be bent less in order to guide it around the caliper edge. Here, the tube 30 is designed to be rigid in a first straight-extending and thicker-walled area and then is designed to be flexible in another area around the caliper 2 toward the adjusting device 26.

Figure 6:
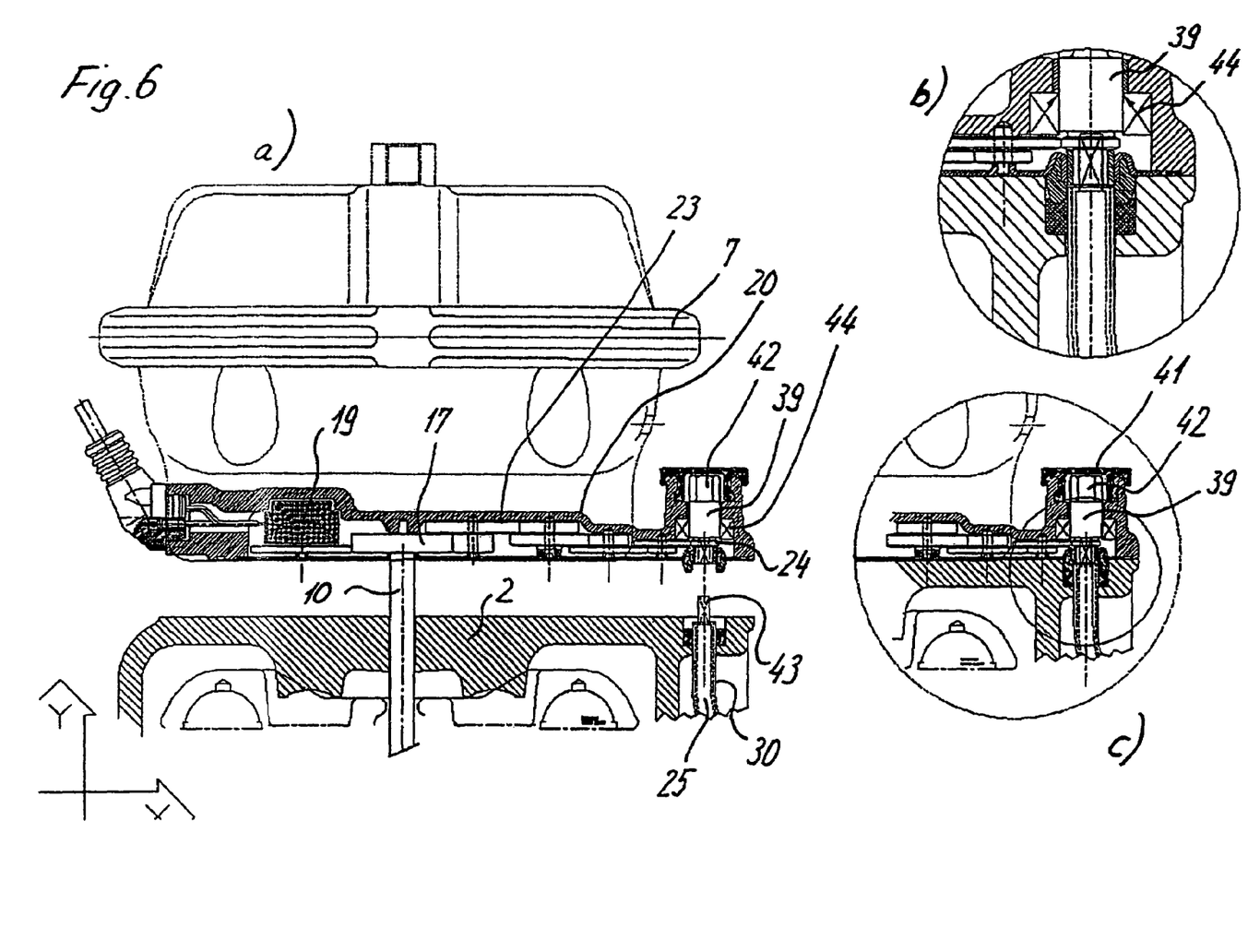
FIGS. 6a to 6c are views of details of elements of another embodiment according to the invention.

As illustrated in FIG. 6 in a supplementary manner, particularly in the embodiment of FIG. 1, it can easily be achieved to place the output gear wheel 24 on a shaft 39 whose one end may be constructed as a hollow-shaft section 40 into which a polygonal head end 43 of the flexible shaft 25 engages. Toward the exterior side or at the end constructed by the hollow-shaft section 40, the shaft 37 disposed in the cover by means of a bearing 44 may be provided, for example, with an external polygonal head 42 which is accessible through a cap 41 on the cover 20. By means of this manually operable restoring device, an optional manual restoring function can thus be implemented in an uncomplicated manner, if required, additionally combined with an overload protection (for example, a desired breaking point in the shaft 37).

Figure 5:
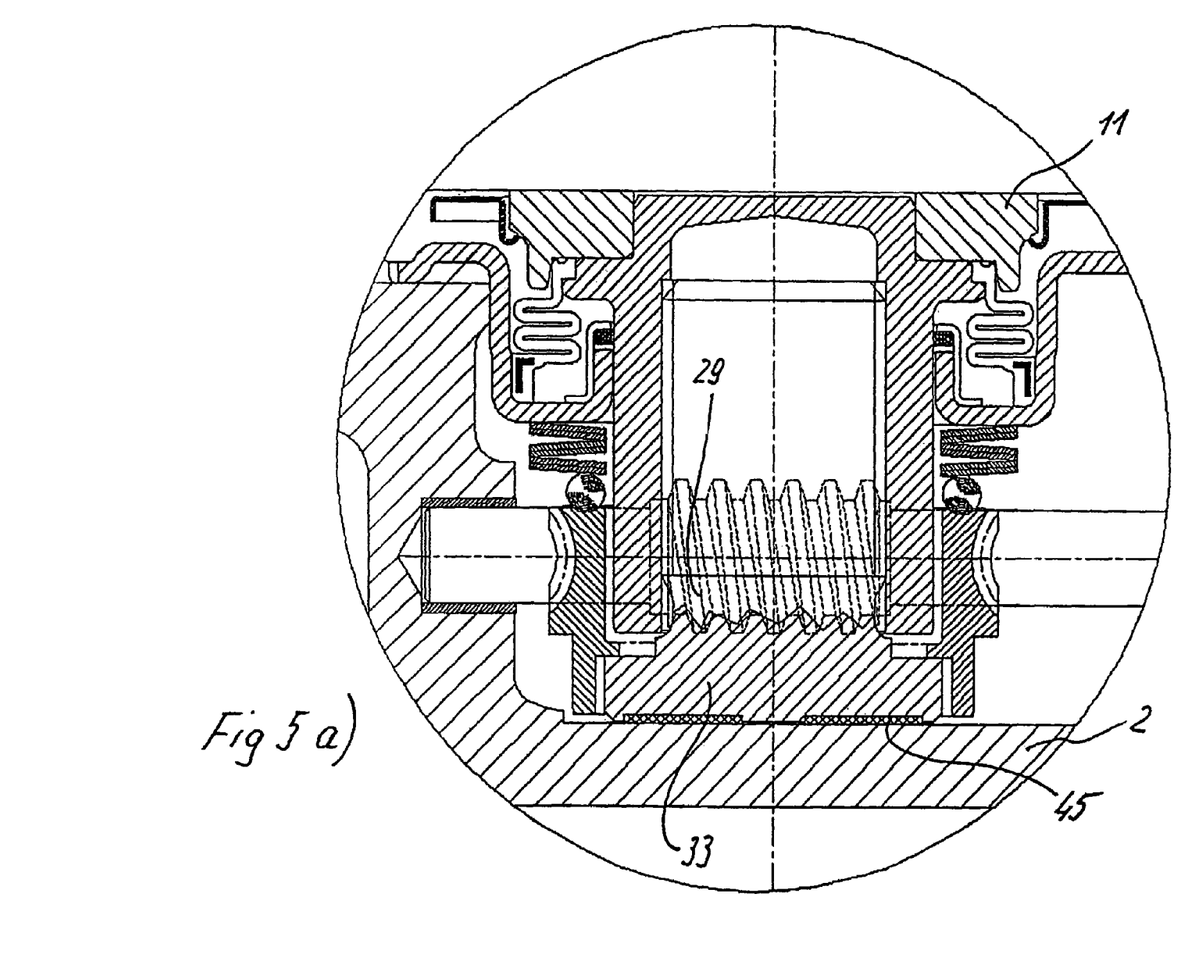
FIGS. 5a to 5c are cutout enlargements and variants of adjusting devices on the side of the caliper facing away from the application device.

According to FIG. 5a, the axially toothed disc is supported by means of slide bearings 45 on the interior of the caliper. Instead, in FIGS. 5b and c, different prestressed springs 46, such as cup springs, are in each case arranged between the disc 33 and the interior of the caliper.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

List of Reference Numbers

Disc brake 1
caliper 2
caliper parts 2a, 2b
brake disc 3
studs 4
application device 5
rotary lever 6
brake cylinder 7
element 8
element 9
adjusting device 10
pressure piece 11
brake shoe 12
adjusting sleeve 13
brake pad 14
synchromesh gear 15
shaft 16
output gear wheel 17
transmission 18
electric motor 19
cover 20
line 21
plug 22
gear wheel 23
gear wheel 23a, 23b, 23c, 23d
output gear 24
shaft 25
adjusting device 26
recess 27
worm gear 28, 29
tube 30
bore 31
guide-through stopper 32
gear wheel 33
disc 34
electric motor 35
attachment 36
output shaft 37
attachment 38
shaft 39
hollow-shaft section 40
cap 41
external polygonal head 42
polygonal head end 43
bearing 44
slide bearing 45
springs 46
restoring spring 47
restoring spring 49
metal sheet 50
piston rod 51

What is claimed is:

1. A pneumatically or electrically operated disc brake, having
   a caliper framing a brake disc,
   an application device arranged in the caliper on an application side of the brake disc,
   at least one electrically driven adjusting device on each side of the brake disc,
   the at least one adjusting device on a reaction side of the brake disc being driven by at least one of a transmission and synchronization gearing which extends from one side of the brake disc to the other,
   wherein
   the adjusting devices are jointly driven on both sides of the brake disc by a single electric motor or two electric motors arranged on an application side of a caliper joint, said caliper joint being located between an application side and a reaction side of the caliper,
   the transmission and/or synchronization gearing is arranged between at least one adjusting device on the reaction side of the brake disc and the single electric motor or at least one of the two electric motors.

2. A disc brake according to claim 1, wherein,
   the transmission and/or synchronization gearing includes a bendable shaft.

3. Disc brake according to claim 2, wherein the bendable shaft is arranged in a tube.

4. A disc brake according to claim 3, wherein at least one of the tube and the bendable shaft is provided with a friction- and wear-reducing intermediate layer.

5. A disc brake according to claim 4, wherein
   the intermediate layer is constructed as a sleeve made of a sliding material between the bendable shaft and the interior tube wall.

6. A disc brake according to claim 3, wherein, in that the tube is arranged on the outside of the caliper.

7. A disc brake according to claim 3, wherein the tube is flexible.

8. A disc brake according to claim 2, wherein
   the electric motor driving the bendable shaft is fastened to the caliper by a separate attachment or an attachment molded thereto, and the output shaft of said electric motor is oriented parallel or inclined with respect to the brake disc axis.

9. A disc brake according to claim 8, wherein
   the bendable shaft extends at least one of on the outside of the caliper, through a caliper interior, and through a duct in the caliper interior.

10. A disc brake according to claim 2, wherein the bendable shaft is equipped with at least one worm drive for driving the adjusting devices on the reaction side of the brake disc.

11. A disc brake according to claim 10, wherein the worm gears mesh with gear wheels on the adjusting devices or with an axially toothed disc.

12. A disc brake according to claim 2, wherein the bendable shaft extends at least one of on the outside of the caliper, through a caliper interior, and through a duct in the caliper interior.

13. Disc brake according to claim 2, wherein the bendable shaft jointly synchronously drives the adjusting devices on the reaction side.

14. A disc brake according to claim 1, wherein the single electric motor or the two electric motors for driving the adjusting devices is/are arranged outside the caliper.

15. A disc brake according to claim 14, having two electric motors for driving the adjusting devices, further comprising: a control device, said control device separately controlling the adjusting devices on each side of the brake disc.

16. A disc brake according to claim 1, having two electric motors for driving the adjusting devices, further comprising: a control device, said control device separately controlling the adjusting devices on each side of the brake disc.

17. A disc brake according to claim 16, wherein two mutually synchronized adjusting devices are arranged on each side of the brake disc, each adjusting device including a sleeve and a screw which cooperate to extent and retract the adjusting device.

18. A disc brake according to claim 1, wherein the application device is an eccentrically disposed rotary lever, the rotary lever is supported by spherical elements on the interior of the caliper, and two additional spherical elements provided on the opposite side of the rotary lever each act upon one of the axially displaceably adjusting devices.

19. A disc brake according to claim 18, wherein the adjusting devices on the application side of the caliper are driven by synchromesh gear, and the synchromesh gear is driven by a shaft which penetrates the rotary lever and the caliper.

20. A disc brake according to claim 1, wherein the caliper is a fixed caliper and the brake disc is axially movable by a working stroke of the brake.

21. A disc brake according to claim 1, wherein two mutually synchronized adjusting devices are arranged on each side of the brake disc, each adjusting device including a sleeve and a screw which cooperate to extent and retract the adjusting device.

22. A disc brake according to claim 1, wherein the caliper is one of a sliding, a hinged, and a flexible caliper movable by a working stroke of the brake.

23. A disc brake according to claim 1, further comprising: a manually operable restoring device.

* * * * *